Dec. 24, 1940.                C. H. KESTENMAN                2,225,745
                                    LINKAGE
                              Filed May 24, 1940
Fig. 1.
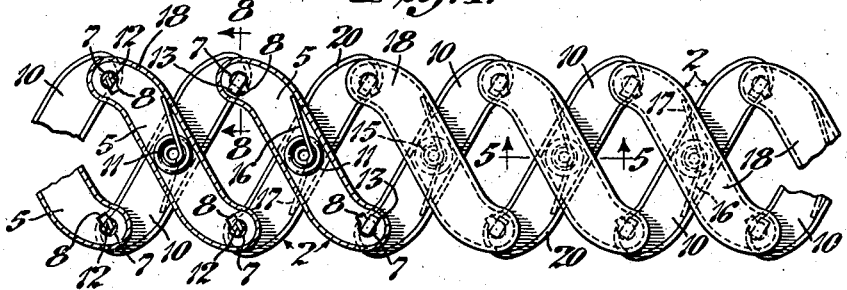
Fig. 2.
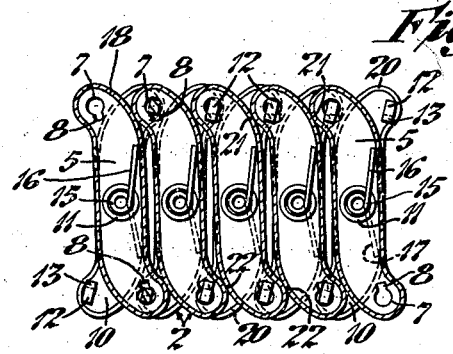          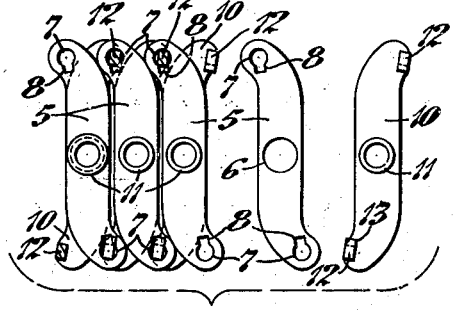
Fig. 3.                Fig. 4.
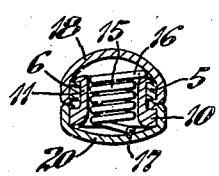     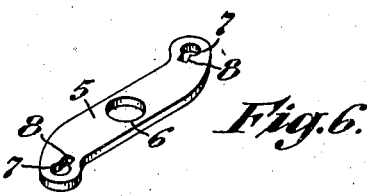
Fig. 5.                Fig. 6.
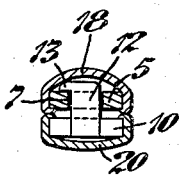     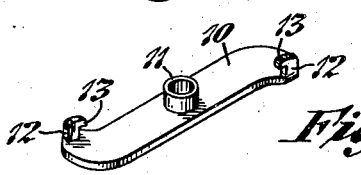
Fig. 8.                Fig. 7.
Inventor:
Charles H. Kestenman
By
        Attorneys.

Patented Dec. 24, 1940

2,225,745

UNITED STATES PATENT OFFICE 2,225,745

LINKAGE

Charles H. Kestenman, Providence, R. I., assignor to Kestenman Bros. Mfg. Co., Providence, R. I., a corporation of Rhode Island Application May 24, 1940, Serial No. 337,014

7 Claims. (Cl. 59—79)

This invention relates to improvements in the manufacture of expansible or extendible linkages for use in articles of jewelry such as bracelets, bands, belts and the like.

One object of the invention is to provide an improved method and means for articulating or pivotally connecting the elements of a linkage or bracelet.

Another object of the invention is to provide an improved pivotal connection between the parts of the linkage which eliminates riveting or similar mechanical operations for connecting the parts.

Another object of the invention is to provide improved pivot-means for connecting the links whereby they may be assembled more conveniently and expeditiously without mechanical operations.

Another object of the invention is to provide a novel form of pivotal joint for the parts of a linkage by means of which the links may be connected without mechanical operations and when so connected are locked securely against disconnection in use.

Further objects of the invention are set forth in the following specification which describes a preferred form of construction of an extensible linkage for bracelets and the like as illustrated by the accompanying drawing. In the drawing:

Fig. 1 is a plan view of a watch-bracelet embodying the present invention;

Fig. 2 is a greatly enlarged plan view of a section of the present improved expansible linkage showing it extended and illustrating certain of the pivot joints and other mechanical features thereof;

Fig. 3 is a similar plan view showing the linkage with its parts contracted into closely adjacent relationship;

Fig. 4 is a composite detailed view showing a plurality of the links connected by the present improved pivot joints and also illustrating certain of the links in disassembled relationship;

Fig. 5 is a further enlarged sectional view taken on line 5—5 of Fig. 2 and showing the central pivotal joint between the links and the spring means for maintaining the linkage contracted in length;

Fig. 6 is a perspective view of one of the links;

Fig. 7 is a similar view of a complementary link for connection with the link illustrated in Fig. 6; and Fig. 8 is a greatly enlarged sectional view taken on line 8—8 of Fig. 2 and illustrating the present improved pivotal joint for connecting the outer ends of the links.

The present invention is adapted particularly for use in the manufacture of flexible bracelets, bands and other extendible linkages of a type now popular in watch-bracelets. This type of linkage comprises a plurality of articulated members pivotally connected at their centers and also pivotally joined at their extremities in X-relationship similar to the construction of the familiar lazy-tongs. The present improved linkage may consist of a plurality of elongate members 2 of generally S-shape pivotally connected at their centers in superimposed relationship and with their opposite ends also pivotally joined so that they may be contracted into close association as shown in Fig. 1, or extended as indicated in Fig. 2, by rocking them on their central pivots. When embodied in articles of jewelry, the linkage is preferably constructed with the pivotally-connected link-elements enclosed in similarly-shaped shells which may be of precious metal or plated therewith to embellish the complete article and conceal its mechanical construction.

The mechanical pivotal elements are constructed in complementary pairs in the form shown in Figs. 6 and 7, being preferably stamped out from sheet-metal. Each link-element 5 consists preferably of a flat substantially S-shaped stamping having an elongate main portion with relatively straight sides and oppositely-curved ends. The element 5 is punched or perforated at the center to provide a relatively large circular opening 6, while at its ends are smaller circular openings 7 notched at one side to provide relatively narrow slots 8. The slots 8 are inclined at an angle to the axis of the element 5, being directed generally toward the geometrical center of the opening 6; each opening at the ends of the link taking the form, more or less, of a keyhole or buttonhole.

The complementary link 10 which is pivoted centrally to the link 5 crosswise thereof is of the same general shape as the latter, but adapted to be connected thereto in reverse underlying relationship. For this purpose the link 10 is provided at its center with an upstanding cylindrical flange forming a hollow rivet 11 adapted for insertion through the central opening 6 in the top link 5 with its end riveted or swaged over the edge thereof, as shown in Fig. 5, to pivotally connect the two link-elements. Each pair of link-elements 5 and 10 are assembled and pivotally connected in this manner and their ends pivotally joined to adjacent pairs of link-elements of the same form and construction. In this manner a whole series of links are assembled in crossed and superimposed relationship with their ends pivotally joined to provide for extension of the linkage as a whole.

The present improvement relates particularly to the means for pivotally connecting the outer ends of the link-elements 5 and 10 and for this purpose the link 10 is formed at its ends with upwardly-projecting prongs or lugs 12 having lateral projections or hooks 13 at their upper ends. Preferably, the prongs or lugs 12 are constructed integrally of the links in the stamping operation, but they may be made separate therefrom and suitably attached thereto. The link-members 5 and 10 are assembled in pairs by placing the member 5 in overlying relationship with the member 10 and inserting the cylindrical flange 11 on the member 10 through the opening 6 in the upper member as shown in Fig. 4. The end of the flange 11 is then swaged or headed over as shown in Fig. 5 to retain the parts in pivotal connection. Each pair of link-elements 5 and 10 thus assembled are joined at their ends to other pairs of links of similar construction and arrangement by first arranging the two connected elements 5 and 10 in substantial alinement and then passing the hook-shaped lugs 12 at the ends of the links 10 through the keyhole openings 7—8 in the links 5, the projections 13 on the lugs 12 being passed through the slots 8 at the sides of the openings 7 in the links 5. A whole series of pairs of links are joined together in this manner to provide a linkage of any desired length.

After the pairs of links 5 and 10 have been connected in sequence in the manner described above, a slight extension of the linkage by rocking the links on their central pivots will cause the projections 13 on the prongs or lugs 12 to swing to one side of the slots 8, as shown in Fig. 3, to prevent disconnection of the linkage elements. In other words, the projections 13 on the lugs 12 act as heads or abutments to hold the parts connected.

To cause the linkage to be maintained normally in contracted relationship as shown in Fig. 1, a plurality of helical springs 15 are enclosed within the cylindrical flanges or hollow rivets 11 on the elements 10 with their opposite ends extending outwardly and bearing against the sides of the shells 18 and 20 which enclose the top and bottom of the joined link-elements 5 and 10.

The upper shell 18 is preferably formed of concavo-convex shape with a highly crowned top and vertical sides conforming to the sides of the upper link-element 5 to fit in closely abutting relation thereagainst; the lower edges of the sides being swaged or formed in under the edges of the link to attach the shell thereto, as clearly illustrated in Fig. 5. The bottom shell 20 is of similar form and construction except that it has a less crown or convexity and its sides are swaged around the upper edges of the link-element 10. The upper end of each spring 15 extends outwardly in a straight arm 16 with its end bearing against the side of the upper shell 18, while the lower arm 17 of the spring is similarly directed against the side of the bottom shell 20; the springs being thus maintained under tension with their ends exerting a force against each upper and lower link-element and tending to swing them on their central pivots to bring them into substantial alinement. The several link-elements 5 and 10 are prevented from swinging into exact alinement by the contact of the ends of their enclosing shells 18, as indicated at 21 and 22 in Fig. 3, so that the projections 13 on the ends of the lugs 12 cannot move into alinement with the slots 8 in the ends of the links to become released therefrom. Consequently, the last operation of assembling the shells on the pairs of link-elements 5 and 10 provides means for limiting the contraction of the linkage and thereby preventing the disconnection of the elements at their ends. It will thus be seen that after the parts of the linkage are once assembled the pivotal joints at the ends of the links cannot be released even when the linkage is contracted or expanded to its extreme extension as indicated in Fig. 2.

From the foregoing specification it will be apparent that the present invention provides a particularly simple yet ingenious method of pivotally connecting the parts of a linkage without requiring riveting or other like mechanical operations. The present form of linkage is adapted for use as an expansible or extendible bracelet, band or the like either as a whole, or as a section thereof. The improved linkage is not only of highly ornamental appearance but has great utility in providing for expansion of the bracelet to allow it to slip over the hand in applying it to the wrist and then conforming to the shape of the wrist to provide a comfortable fit.

While the device is herein shown as embodied in a preferred from of construction, it is to be understood that various modifications may be made in the structure and arrangement of its parts without departing from the spirit or scope of the invention. Therefore, without limiting myself in this respect, I claim:

1. In a linkage for articles of jewelry such as bracelets, bands, belts and the like, the combination of a plurality of link-elements, and means for pivotally connecting the plurality of link-elements at their opposite ends to provide an expansible linkage comprising elongate openings at the ends of certain of said elements and hooked prongs on cooperating link-elements, the hooked prongs on certain of the elements engaging through the elongate openings in the other link-elements with the hooks adapted to overlie the sides of said openings to prevent disconnection of the link-elements.

2. A linkage for articles of jewelry, and the like comprising a plurality of superimposed link-elements certain of said elements having elongate openings at their opposite ends and other of said elements having hooked prongs at their opposite ends engaging through the elongate openings in the first-named elements to adapt them to pivotally connect the ends of said elements whereby when they are slightly extended one in relation to the other the hooks on the prongs will prevent disconnection of the ends of said elements.

3. A linkage for articles of jewelry and the like comprising a series of link-elements having prongs at the opposite ends of certain of said link-elements with hooks projecting laterally from said prongs, cooperating link-elements superimposed on the first-named link-elements and having elongate openings at their opposite ends for receiving the hooked prongs on the first-named elements whereby when said link-elements are slightly extended one in relation to another the hooks on the prongs will overlie the sides of the elongate openings to prevent disconnection of the link-elements.

4. A linkage for articles of jewelry and the like comprising a plurality of elongate link-elements, one set of link-elements having openings of keyhole shape at their opposite ends and another cooperating set of link-elements connected at their ends to the first-named elements by means of key-shaped lugs at their opposite ends inserted through the keyhole openings in the first-mentioned link-elements in position to pivotally articulate the link-elements to provide a lazy-tongs action thereof while locking them against disconnection.

5. A linkage for articles of jewelry and the like comprising two series of superimposed link-elements pivotally connected at their centers, one series of the link-elements having openings at their ends of keyhole shape, the opposite set of link-elements having lugs in the shape of keys projecting through the keyholes in the other link-elements, and means to prevent the link-elements of the different series from being swung into alinement by their pivoting motion whereby to maintain the key-shaped lugs on one set of elements locked in the keyholes in the other set of elements.

6. A linkage for articles of jewelry and the like comprising two sets of elongate link-elements arranged with one set superimposed on the other in crossed relation thereto and pivoted together at their centers, openings of keyhole shape at the ends of one set of link-elements, key-shaped lugs projecting from the ends of the opposite set of link-elements and locked in the keyholes of the first-named set of elements, resilient means for maintaining said link-elements swung into close association to contract the linkage, and means for preventing the link-elements from being moved into position to release the key-shaped lugs from the keyholes.

7. A bracelet or like article comprising two sets of link-elements pivoted together at their centers in superimposed relationship, one set of link-elements having openings in the shape of keyholes at their ends and the other set of link-elements having key-shaped lugs engaging through the keyhole openings of the other set, resilient means for relatively swinging the elements to contract the linkage, and means for preventing disengagement of the key-shaped lugs from the keyholes in whatever position the link-elements assume.

CHARLES H. KESTENMAN.